US005953494A

United States Patent [19]

Okayasu

[11] Patent Number: 5,953,494

[45] **Date of Patent: *Sep. 14, 1999**

[54] METHOD FOR CONTROLLING A DRAWING APPARATUS, A DRAWING APPARATUS AND A WAVEFORM RECORDING APPARATUS

[76] Inventor: Kenji Okayasu, 20-15, Mukai-machi, Gyoda-shi, Saitama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/494,902

[22] Filed: Jun. 26, 1995

[30] Foreign Application Priority Data

Jun. 24, 1994 [JP] Japan .................................... 6-143389

[51] Int. Cl.[6] ............................ G05B 1/00; G01D 18/00; G08C 21/00

[52] U.S. Cl. ............................ 395/103; 346/29; 33/1 M; 33/18.2

[58] Field of Search ......................... 346/25, 29; 33/1 M, 33/18.2; 395/103; 250/202

[56] References Cited

U.S. PATENT DOCUMENTS 4,216,482 8/1980 Mason .................................... 346/129
4,459,604 7/1984 Kudelski et al. ....................... 347/161
5,170,047 12/1992 Beauchamp et al. ..................... 346/25
5,262,797 11/1993 Boeller et al. ............................ 346/25
5,299,290 3/1994 Ostermeier ................................ 346/25
5,383,393 1/1995 Ueda et al. ............................. 101/220
5,652,412 7/1997 Lazzouni et al. ......................... 341/13

*Primary Examiner*—Safet Metjahic
*Assistant Examiner*—Michael Dalakis
*Attorney, Agent, or Firm*—Jordan and Hamburg LLP

[57] ABSTRACT

Ruled lines printed on a graph paper g are optically detected by a vertical ruled line reading sensor and a horizontal ruled line reading sensor. Ruled line spacing Dp in a plotter coordinate system P is measured and compared with ruled line spacing Dg in the a coordinate system G of a given graph paper, and the correspondence relationship between coordinate system G of the graph paper and coordinate system P of the plotter is determined. When a drawing command is inputted, a coordinate Zc in the drawing command is treated as a coordinate Zg in the coordinate system G of the graph paper, and this coordinate Zg is converted to coordinate Zp in the coordinate system P of the plotter, using the correspondence relationship. The drawing command is then executed with respect to the converted coordinate Zp. As a result, figures or waveforms that match the ruled lines of the graph paper can be drawn. Ordinary graph paper can be used because the ruled lines are read, contributing to ease of use. Even if a graph paper with ruled line spacing that differs from the ruled line spacing in the drawing command is used, figures can be modified easily without performing complex calculations.

9 Claims, 11 Drawing Sheets

64

| THE COORDINATE Zgcp OF THE GRAPH PAPER COORDINATE SYSTEM | THE COORDINATE Zgcp OF THE PLOTTER COORDINATE SYSTEM |
|---|---|
| 0, 0 | 0, 0 |
| 20, 0 | 19.0, 0.0 |
| 40, 0 | 38.0, 0.0 |
| ⋮ | ⋮ |
| 20, 20 | 19.0, 20.6 |
| 40, 20 | 38.0, 20.6 |
| ⋮ | ⋮ |
| 40, 40 | 38.0, 41.4 |
| ⋮ | ⋮ |

METHOD FOR CONTROLLING A DRAWING APPARATUS, A DRAWING APPARATUS AND A WAVEFORM RECORDING APPARATUS

BACKGROUND OF THE INVENTION

The present invention relates in general to a method for controlling a drawing apparatus, a drawing apparatus, and a waveform recording apparatus. More particularly, the present invention relates to a method of controlling drawing apparatus, a drawing apparatus, and a waveform recording apparatus that can draw figures or waveforms to match to the ruled lines of a graph paper.

A typical example of drawing apparatus is a plotter, which treats the coordinate Zc in an input drawing command as the coordinate Zp in the plotter coordinate system P, moves the movable drawing head two-dimensionally to the coordinate Zp, and draws a figure on paper using devices such as a pen. White paper is generally used in a plotter.

Another example of drawing apparatus is a waveform recording apparatus, which treats a coordinate Zc in an input drawing command as a coordinate Zp in the coordinate system P of the waveform recording apparatus, moves the movable drawing head one-dimensionally to the coordinate Zp, and draws a waveform on paper traveling in a direction perpendicular to movement of a head using devices such as a pen. Generally, graph paper, which is printed with ruled lines, is used in a waveform recording apparatus.

A plotter generally draws figures on white paper; in such cases, it is not possible to read the dimensions of the figure drawn by a plotter. A graph paper may be used instead of white paper, but if a graph paper, has contracted or expanded because of humidity, the lines of the figure drawn will be offset from the ruled lines of the graph paper. In practice, only approximate dimensions can be read.

On the other hand, waveforms are generally drawn on graph paper in a waveform recording apparatus, but because of the offset between the ruled lines of the graph paper and the lines of the drawn waveform, only approximate values can be read in this case also.

SUMMARY OF THE INVENTION

The objects of the present invention are to provide a method for controlling a drawing apparatus, a drawing apparatus, and a waveform recording apparatus for drawing figures or waveforms matching ruled lines of a graph paper.

As a first aspect, the present invention provides a method for controlling a drawing apparatus for drawing figures on a graph paper according to an input drawing command wherein: the ruled line spacing Dp in a coordinate system P of the drawing apparatus is acquired by detecting ruled lines printed on the graph paper; ruled line spacing Dg in a coordinate system G of the given graph paper is compared with the ruled line spacing Dp in the coordinate system P of said drawing apparatus and a correspondence relationship between the coordinate system G of the graph paper and the coordinate system P of the drawing apparatus is determined; the coordinate Zc in the input drawing command is treated as the coordinate Zg in the coordinate system G of the graph paper, the coordinate Zg is converted to coordinate Zp in the coordinate system P of the drawing apparatus, and the drawing command is executed for the coordinate Zp.

Graph paper in this specification refers to paper wherein at least two parallel lines are printed. More specifically, graph paper in this specification refers to section paper, logarithmic coordinate paper, and recording paper for electrocardiograph or seismograph.

As a second aspect, the present invention provides a method for controlling a drawing apparatus according to the first aspect wherein; reference correction points CP are set at grid points of every n ($n \geqq 2$) ruled lines and the reference correction points CP that diagonally enclose said coordinate Zg in the coordinate system G of the graph paper are coordinates Zpcp in the coordinate system P of the drawing apparatus, by straight line interpolation of these coordinates Zpcp, the coordinate Zp in the coordinate system P of the drawing apparatus is found as coordinate corresponding to the coordinate Zg in the coordinate system G of the graph paper.

As a third aspect, the present invention provides a drawing apparatus for drawing figures on a graph paper, comprising a movable drawing head that moves according to an input drawing command, ruled line detecting means for detecting ruled lines printed on the graph paper set on the movable drawing head; means for acquiring ruled line spacing Dp in the coordinate system P of the drawing apparatus, wherein the movable drawing head is moved with respect to the graph paper before drawing a figure using the ruled line detecting means; coordinate system correspondence relationship acquisition means wherein ruled line spacing Dg in the coordinate system G of the graph paper and the ruled line spacing Dp in the coordinate system P of the drawing apparatus are compared, and the correspondence relationship between coordinate system G of the graph paper and coordinate system P of the drawing apparatus is acquired; coordinate conversion means wherein coordinate Zc in the input drawing command is treated as coordinate Zg in the coordinate system G of the graph paper, and the coordinate Zg is converted to coordinate Zp in the coordinate system P of the drawing apparatus using the correspondence relationship; and coordinate replacement means for replacing the coordinate Zc to the coordinate Zp during execution of the drawing command.

As a fourth aspect, the present invention provides a drawing apparatus with the above configuration with the ruled line detecting means comprising light emitting means and light receiving means which have a comparatively longer sensitivity range in a direction of the ruled lines to be detected and a comparatively shorter sensitivity range perpendicular to the direction of ruled lines, respectively.

As a fifth aspect, the present invention provides a waveform recording apparatus having a movable drawing that head is moved single-dimensionally according to an input drawing command, a graph paper that is moved in a direction perpendicular to the direction of the drawing head. Wherein a waveform is drawn on the graph paper, comprising: a first ruled line offset detecting means and a second ruled line offset detecting means provided with means for emitting light and a means for receiving light with comparatively longer and shorter sensitivity ranges respectively, along and perpendicular to the direction of printed ruled lines respectively on the graph paper, both means fixed at defined positions on two edges of the ruled lines which are parallel to the direction of travel of the graph paper on which ruled lines are printed and above the movable drawing head, for optically detecting offsets from the defined positions; ruled line spacing acquisition means for acquiring ruled line spacing Dp in the coordinate system P of the waveform recording apparatus using the ruled line detecting means; coordinate system correspondence relationship acquisition means for acquiring correspondence relationship between a coordinate system G of a graph paper and a coordinate system P of the drawing apparatus by comparing the ruled line spacing Dg in the coordinate system G of the given graph paper and the ruled line spacing Dp in coordinate system P of the waveform recording apparatus; coordinate conversion means for converting coordinate Zc in the input drawing command to coordinate Zp in the coordinate system P of the waveform recording apparatus by treating coordinate Zc as coordinate Zg in the coordinate system G of the graph paper and using the correspondence relationship; and coordinate replacement means for replacing the coordinate Zc with the coordinate Zp during execution of the drawing command.

In the method for controlling a drawing apparatus according to the first aspect of the present invention, the ruled lines printed on the graph paper are detected, ruled line spacing Dp in the coordinate system P of the drawing apparatus is measured, the ruled line spacing Dg in the coordinate system G of the given graph paper and the measured ruled line spacing Dp in the coordinate system P of the drawing apparatus are compared, and the correspondence relationship between coordinate system G of the graph paper and coordinate system P of the drawing apparatus is obtained. When a drawing command is inputted, the coordinate Zc in this drawing command is treated as coordinate Zg in the coordinate system G of the graph paper, and converted to coordinate Zp in the coordinate system P of the drawing apparatus using the correspondence relationship. The drawing command mentioned above is then executed with respect to the converted coordinate Zp.

As a result, even if the graph paper contracts or expands because of humidity or some other reason, a figure or a waveform can be drawn to match the printed ruled lines. Consequently,the ruled lines of the graph paper can be used as a scale, and dimensions and values can be read with high accuracy from the drawn figure or waveform.

In the method for controlling drawing apparatus according to the second aspect of the present invention, the reference correction points CP are set at grid points of every n ($n \geqq 2$) ruled lines. And supposing the reference correction points CP that diagonally enclose the coordinate Zg in the coordinate system G of the graph paper are coordinates Zpcp in the coordinate system P of the drawing apparetus, by straight line interpolation of these coordinates Zpcp , the coordinate Zp in the coordinate system P of the drawing apparatus is found as coordinate corresponding to the coordinate zg in the coordinate system G of the graph paper.

As a result, drawing speed can be higher, than in the case where the reference correction points are not set, such case being that coordinate zg in the coordinate system G of the graph paper is converted to coordinate Zp in the coordinate system P of the drawing apparatus while detecting the ruled lines one by one.

In the drawing apparatus according to the third aspect of the present invention, a ruled line detecting means is installed in the movable drawing head, the movable drawing head is moved and graph paper is scanned by the ruled line detecting means before drawing a figure, ruled lines printed on the graph paper are detected, and ruled line spacing Dp in the coordinate system P of the drawing apparatus is measured. Next, the ruled line spacing Dg in the coordinate system G of the given graph paper and the measured ruled line spacing Dp in the coordinate system P of the drawing apparatus are compared, and the correspondence relationship between coordinate system G of the graph paper and the coordinate system P of the drawing apparatus is acquired. When a drawing command is inputted, the coordinate Zc in the drawing command is treated as coordinate Zg in the coordinate system G of the graph paper, and converted to coordinate Zp in the coordinate system P of the drawing apparatus using the correspondence relationship. Subsequently, the drawing command is executed with respect to the converted coordinate Zp.

As a result, even if the graph paper contracts or expands because of humidity or some other reason, figures can be drawn to match the printed ruled lines. Consequently, the ruled lines of the graph paper can be used as a scale, and dimensions can be read accurately from drawn figures.

In the drawing apparatus according to the fourth aspect of the present invention, ruled lines are detected using light emitting and light receiving means with a comparatively longer sensitivity range in a direction of the ruled lines to be detected, and a comparatively shorter sensitivity range in a perpendicular direction, respectively.

As a result, signal components for ruled lines to be detected are more prominent than signal components for ruled lines perpendicular to the ruled lines to be detected. Consequently, even if vertical and horizontal lines intersect, ruled lines can be detected accurately without interference from ruled lines perpendicular to ruled lines to be detected. Moreover, even if the ruled lines to be detected are partially broken or scraped off, they can be detected accurately.

In the waveform recording apparatus according to the fifth aspect of the present invention, a light emitting means and a light receiving means with comparatively longer and comparatively shorter sensitivity ranges respectively, in directions parallel to and perpendicular to the direction of travel of the graph paper respectively, are fixed at defined positions on the two outermost ruled lines of the graph paper in a direction parallel to the travel of the graph paper and above the movable drawing head, which optically detect the offset from the defined positions of the two ruled lines, and measure the ruled line spacing Dp in the coordinate system P of the waveform recording apparatus. Next, the ruled line spacing Dg in the coordinate system G of the graph paper and the ruled line spacing Dp of the coordinate system P of the waveform recording apparatus are compared, and the correspondence relationship between coordinate system G of the graph paper and the coordinate system P of the waveform recording apparatus is determined. When a drawing command is inputted, the coordinate Zc in the drawing command is treated as coordinate Zg in the coordinate system G of the graph paper, and this coordinate Zg is converted to coordinate Zp in the coordinate system P of the waveform recording apparatus according to the correspondence relationship. Subsequently, the drawing command is executed with respect to the converted coordinate Zp.

As a result, even if the graph paper contracts or expands because of humidity or some other reason, waveforms matching the printed ruled lines can be drawn. Consequently, the ruled lines of the graph paper can be used as a scale, and values from the drawn waveforms can be read with high accuracy.

Moreover, according to the light emitting and the light receiving means, the signal components from the ruled lines to be detected are more prominent than the signal components from lines perpendicular to the ruled lines to be detected, therefore, even if vertical and horizontal ruled lines intersect each other, the ruled lines can be detected with high accuracy, without interference from the ruled lines perpendicular to the lines to be measured. Furthermore, even if the ruled lines to be detected are partially broken or scraped off, they can be detected with high accuracy.

Also, the light emitting means and the light receiving means are fixed and positioned above the movable drawing head in the direction of travel of the graph paper, therefore, the means can detect offsets from defined positions of the ruled lines, eliminating the need for scanning the graph paper and contributing to ease of use.

DETAILED DESCRIPTION OF THE INVENTION

The present invention will hereinafter be described in more detail by referring to the embodiments shown in the figures. However, it must be understood that these embodiments are intended to illustrate the invention and are not to be construed to limit the scope of the invention.

Figure 1:
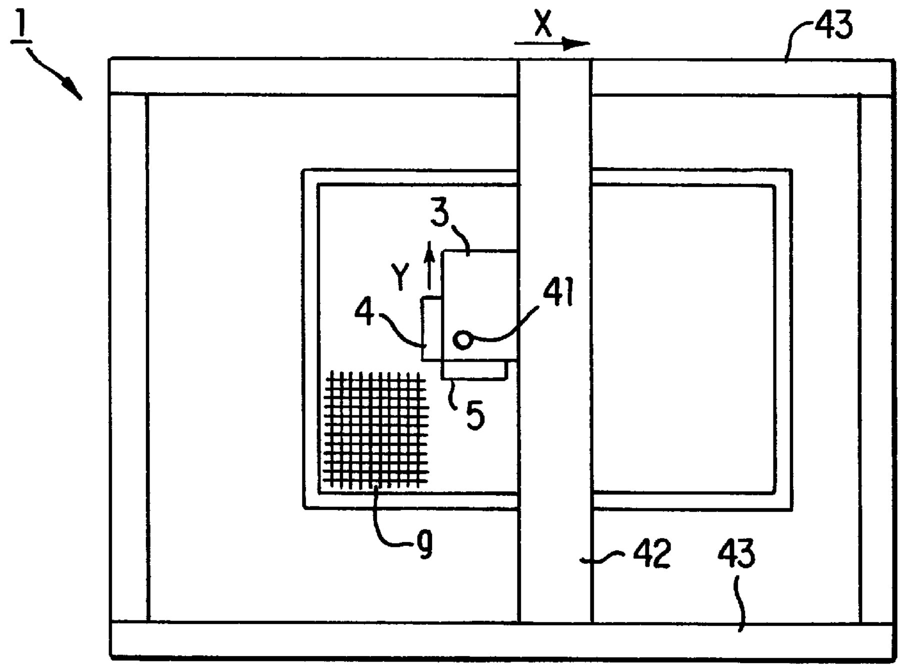
FIG. 1 is a plan view of an X-Y plotter, which is a first embodiment of the present invention

FIG. 1 is a plan view showing a X-Y plotter 1, which is the first embodiment according to the present invention.

The X-Y plotter 1 comprises a movable pen unit 3, which holds a drawing pen 41, and slides on a Y-axis rail 42. The Y-axis rail 42 slides on an X-axis rail 43.

The movable pen unit 3 is provided with a vertical ruled line reading sensor 4 for detecting vertical ruled lines (ruled lines parallel to the Y axis) of a graph paper g, and a horizontal ruled line reading sensor 5 for detecting horizontal ruled lines (ruled lines parallel to the X axis).

Figure 2:
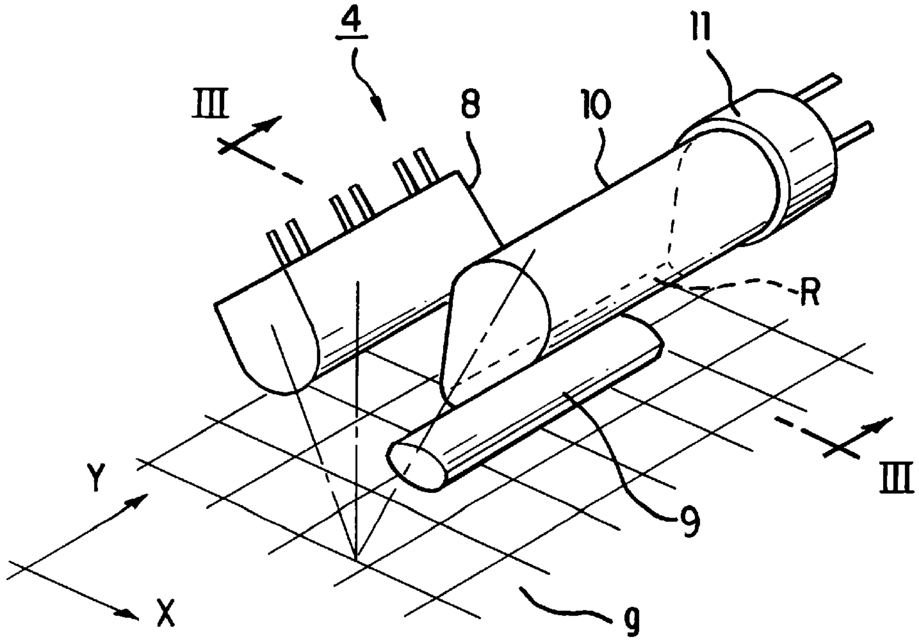
FIG. 2 is a perspective view of parts of a vertical ruled line reading sensor.

FIG. 2 is a perspective view of the vertical ruled line reading sensor 4.

Figure 3:
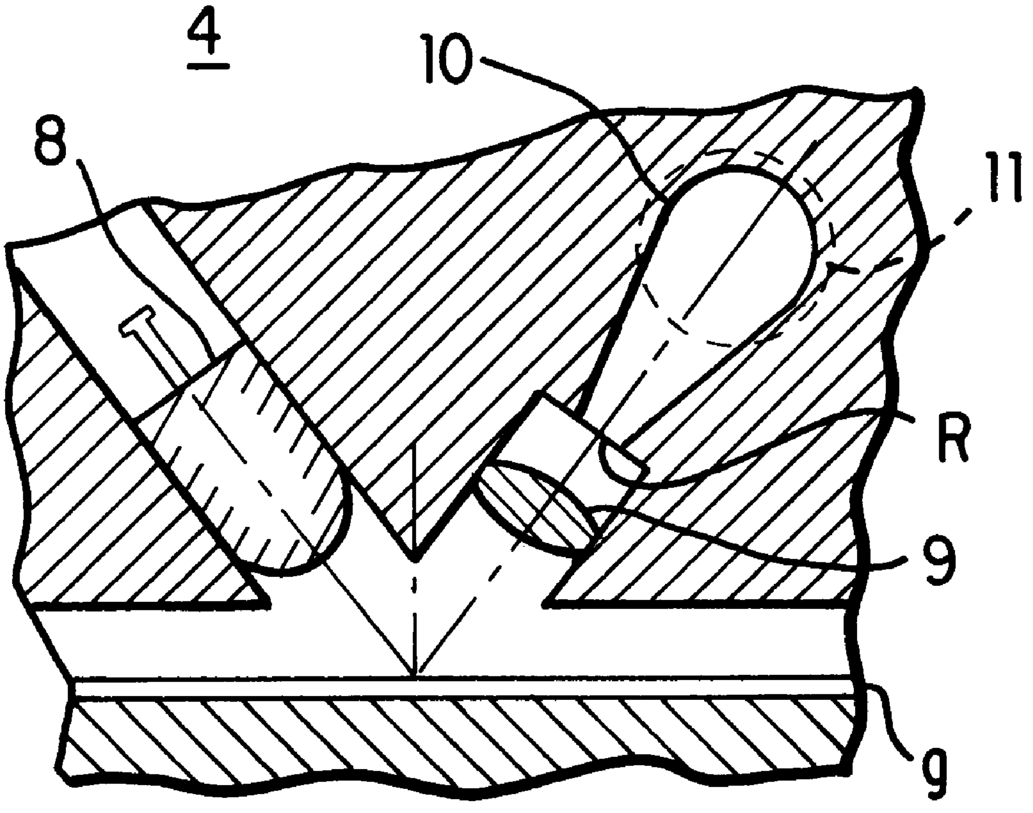
FIG. 3 is a cross section view at line III—III of FIG. 2.

FIG. 3 is a cross section view at line III—III of FIG. 2.

The vertical ruled line reading sensor 4 illuminates the surface of the graph paper g using an infrared LED array 8, receives the light reflected from the surface of the paper by means of a lens 9 and a light guide 10 with light receiving surface R. This received light is detected by a phototransistor 11 provided in the light guide 10. When the movable pen unit 3 detects the reflected light while moving in the direction of the X axis, the output of the phototransistor 11 varies when the movable pen unit 3 passes over vertical ruled lines, therefore, the vertical ruled lines can be detected. Transparent materials such as glass or acrylic can be used in the light guide 10.

The length of the infrared LED array 8, lens 9 and light guide 10 is longer in the direction of the vertical ruled lines and shorter in the direction of horizontal ruled lines. Therefore, the signal components due to vertical ruled lines are more prominent compared to the signal components due to the horizontal ruled lines. Consequently, even if vertical and horizontal ruled lines intersect, vertical ruled lines are detected accurately. Even if a vertical line is partially broken or scraped off, it can be detected correctly.

The horizontal ruled line reading sensor 5 has a configuration similar to the vertical ruled line reading sensor 4.

Figure 4:
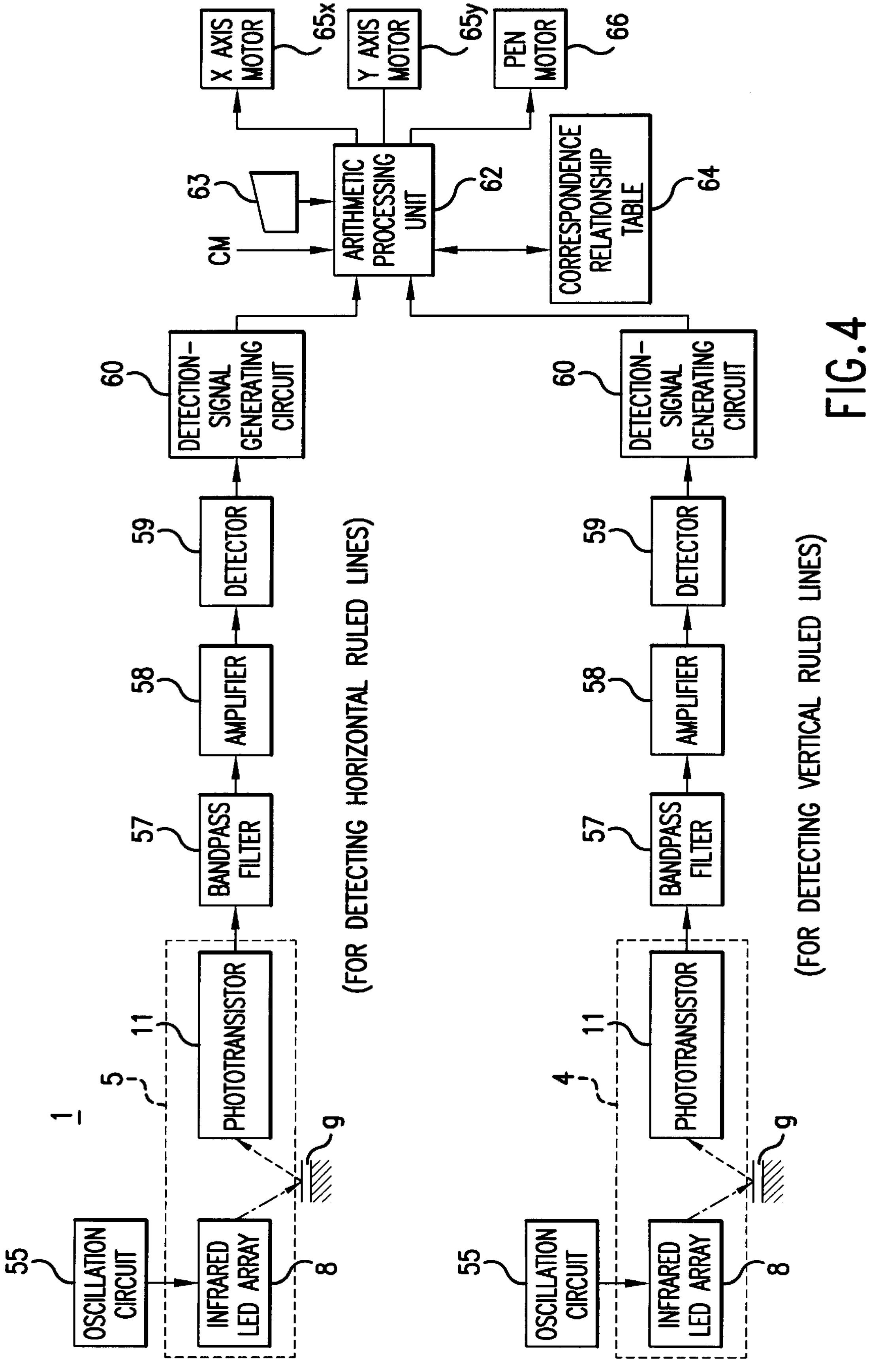
FIG. 4 is a block diagram showing a signal processing system of the X-Y plotter of FIG. 1.

FIG. 4 is a block diagram showing a signal processing system of the X-Y plotter 1 of FIG. 1.

Light from the infrared LED array 8, after being modulated by an oscillation circuit 55, illuminates the graph paper g. The light reflected from the graph paper g is received by the phototransistor 11. A bandpass filter 57, an amplifier 58 and a detector 59 remove noise components and carrier components from the output of the phototransistor 11. A detection-signal generating circuit 60 judges the ruled line from a change in output of the phototransistor 11, and outputs a detection signal. This detection system comprises two systems—a system for detecting vertical lines and a system for detecting horizontal lines.

An arithmetic processing unit 62 determines the correspondence relationship between a coordinate system G of the graph paper and a coordinate system P of the plotter, based on the detected signals and an input from the input panel 63, and stores this relationship in a correspondence relationship table 64. This correspondence relationship acquisition process is explained in further detail later referring to FIG. 5.

Moreover, the arithmetic processing unit 62 receives a drawing command CM from an external computer, treats a coordinate Zc in a drawing command CM as the coordinate Zg in the coordinate system G of the graph paper, converts it to coordinate Zp in the plotter coordinate system P using the correspondence relationship, drives an X axis motor 65*x*, a Y axis motor 65*y* and a pen motor 66, and executes the drawing command for the coordinate Zp. The processing for drawing is explained later in detail, referring to FIG. 8.

Figure 5:
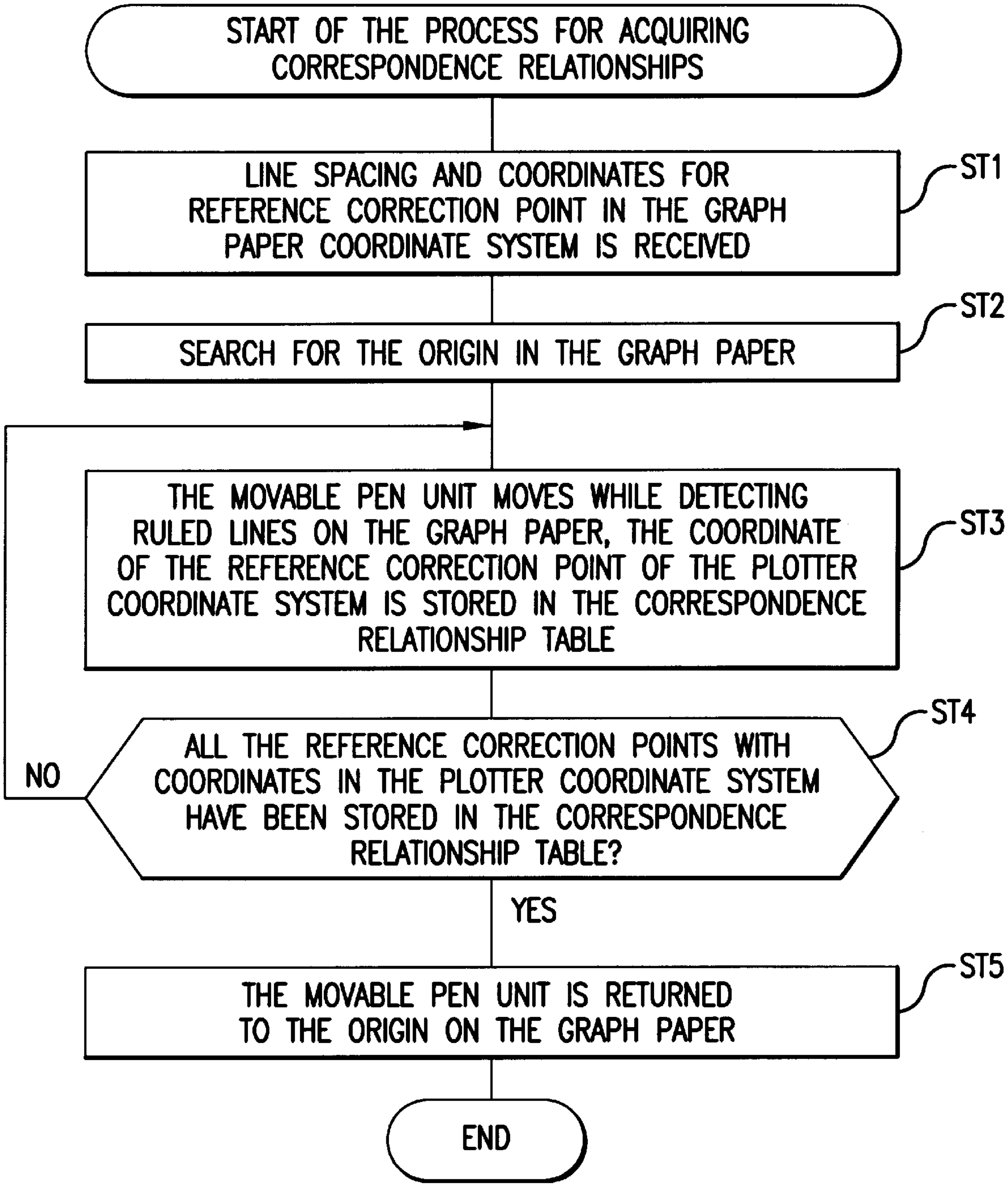
FIG. 5 is a flow chart of a process for acquiring correspondence relationships of the X-Y plotter of FIG. 1.

FIG. 5 is a flow chart of the process for acquiring the the correspondence relationships. This acquisition of correspondence relationships is implemented after the user sets the graph paper and inputs the command for implementing the acquisition of correspondence relationships from input panel 63.

In step ST1, the user's input of vertical line spacing Dgy and horizontal line spacing Dgx in the graph paper coordinate system G is received. The user's input of coordinate Zgcp, the coordinate of the reference correction point (shown as CP in FIG. 6) in the graph paper coordinate system G is also received.

Figures 6, 7:
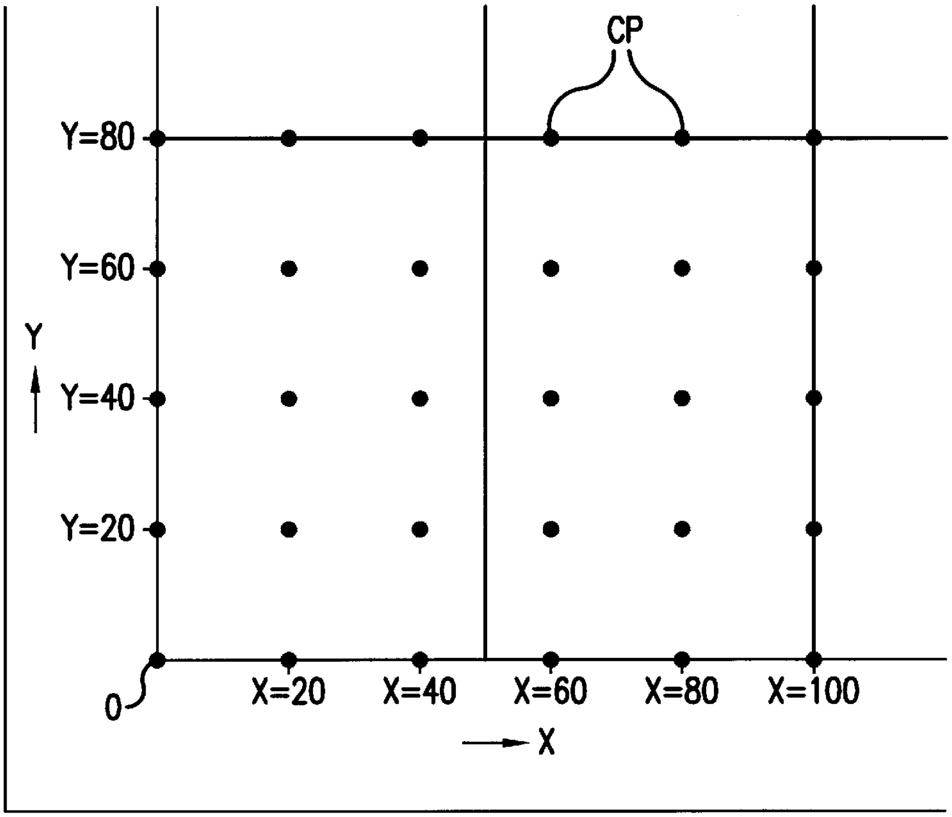
FIG. 6 is an explanatory drawing of a corrected reference point.
FIG. 7 is an illustration of a correspondence relationship table.

For instance, as shown in FIG. 6, if the graph paper g contains ruled lines at a pitch of 1 mm, the user inputs Dgy=1 mm and Dgx=1 mm. Again, as shown in FIG. 6, if a reference correction point CP is to be set at each grid point for 20 ruled lines, the user inputs Zgcp=(0,0), (20,0), . . . and so on. Considering the accuracy of the graph paper g and the capacity of the correspondence relationship table 64, the density of the reference correction points CP to be set can be decided appropriately. For instance, if the accuracy of the graph paper g is high, and the offset is small, reference correction points CP can be set at each grid point of the 50 to 100 ruled lines. Also, for instance, if the capacity of the correspondence relationship table 64 is adequate, the reference correction points CP can be set at grid points of every 10 ruled lines.

If the number of reference correction points CP is large (for instance, when the ruled line spacing Dgy and the horizontal ruled line spacing Dgx of the graph paper is 1 mm, size is A3 (297 mm×420 mm), and if reference correction points CP are set at the grid points of every 20 ruled lines, then the number of reference correction points CP will be 315 (15×21)), and input of Zgcp coordinates for each reference correction point CP will become troublesome, therefore, instead of the input of Zgcp coordinates for the reference correction points CP, it is preferable that the user input the number of ruled lines in 1 pitch of the reference correction point, so that the arithmetic processing unit 62 automatically generates the Zgcp coordinates using the number of ruled lines.

In step ST2, the movable pen unit 3 moves without dropping the drawing pen 41 (FIG. 1) and searches for the origin O on the graph paper g. That is, the movable pen unit 3 moves while detecting vertical and horizontal ruled lines, searching for the point of intersection of the nearest vertical ruled line to its left and the nearest horizontal ruled line below it.

In step ST3, the movable pen unit 3 moves along the X axis direction and the Y axis direction while detecting vertical and horizontal ruled lines; on the graph paper g. At the position where the following relation is satisfied:

(number of vertical ruled lines detected×Dgy, number of horizontal ruled lines×Dgx)=coordinate Zgcp;

the coordinate Zpcp of the plotter coordinate system P is stored in the correspondence relationship table 64. FIG. 7 is an illustration of a correspondence relationship table 64.

In step ST4, a check is made to judge whether or not all the reference correction points CP with coordinates Zpcp in the plotter coordinate system P have been stored in the correspondence relationship table 64. If all the points have been stored, the process advances to step ST5, otherwise the process returns to the previous step ST3.

In step ST5, the movable pen unit 3 is returned to the origin O on the graph paper g.

Figure 8:
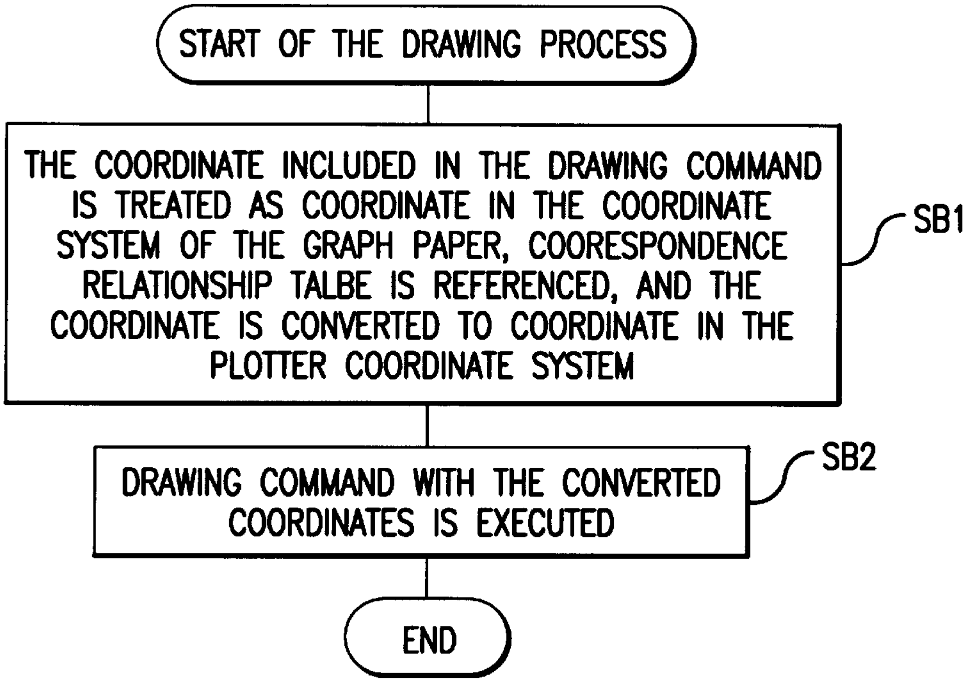
FIG. 8 is a flow chart of a drawing process of the X-Y plotter of FIG. 1.

FIG. 8 is a flow chart of the drawing process. This drawing process starts when a drawing command CM is received from the external computer.

In step SB1, the coordinate Zc included in the drawing command CM is treated as coordinate Zg in the coordinate system G of the graph paper, the correspondence relationship table 64 is referenced, and the coordinate Zg is converted to coordinate Zp in the plotter coordinate system P.

For instance, if the coordinate Zc included in the drawing command CM is given by Zc=(20, 20), the coordinate Zp in the plotter coordinate system P is found as Zp=(19.0, 20.6), which corresponds to Zg=(20, 20) in the coordinate system G of the graph paper. Therefore, the coordinate Zc=(20, 20) included in the drawing command CM is converted to (19.0, 20.6).

Again, for instance if the coordinate Zc included in the drawing command CM is given by Zc=(30, 30), the reference correction points CP that diagonally enclose the coordinate Zg=(30, 30) in the coordinate system G of the graph paper are Zgcp=(20, 20) and Zgcp=(40, 40); the coordinates of plotter coordinate system P, which correspond to these points are Zpcp=(19.0, 20.6) and Zpcp=(38.0. 41.4). By straight line interpolation of these Zpcp coordinates, the coordinate Zp of the plotter coordinate system P, is found as Zp=(28.5, 31.0) corresponding to the coordinate Zg=(30, 30) of the coordinate system G on the graph paper. Therefore, the coordinate Zc=(30, 30) included in the drawing command CM is converted to (28.5, 31.0).

In step SB2, the drawing command CM with the converted coordinates is executed.

As a result, if the drawing command CM is a command to draw a straight line from coordinate Zc=(0, 0) to coordinate Zc=(20, 20), the drawing command CM will be converted to a command for drawing the straight line from coordinate Zp=(0, 0) to coordinate Zp=(19.0, 20.6), and this command will be executed. This will be the line B shown in FIG. 9, which matches the ruled lines of the graph paper g.

Figure 9:
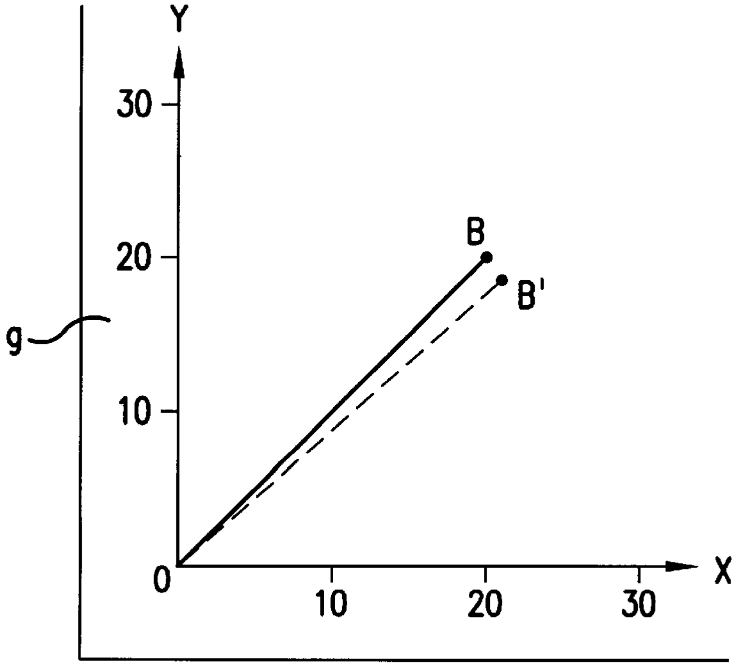
FIG. 9 is an explanatory drawing of results drawn on a graph paper.

The straight line B' shown in FIG. 9, is a line that would have been drawn if the command CM for drawing a straight line from coordinate Zc=(0, 0) to coordinate Zc=(20, 20) had been executed without any conversion. In practice, despite the drawing of the line faithfully according to the drawing command CM, if the graph paper g has contracted or expanded, the straight line does not; coincide with the ruled lines.

According to the X-Y plotter 1 of the first embodiment, a figure can be drawn to coincide with the ruled lines even if the graph paper g has contracted or expanded. The result is that the ruled lines of the graph paper g can be used as a scale, and the dimensions of figures drawn on the graph paper g can be read with high accuracy.

The coordinate Zc in the drawing command can be converted instantaneously to the plotter coordinate Zp because reference correction points CP have been set, and there is no delay at all in the drawing speed; however, if the reference correction points CP are not set, the movable pen unit 3 has to move while reading the ruled lines one by one with the ruled line reading sensor 4, therefore, the drawing speed may be delayed considerably.

Figure 10:
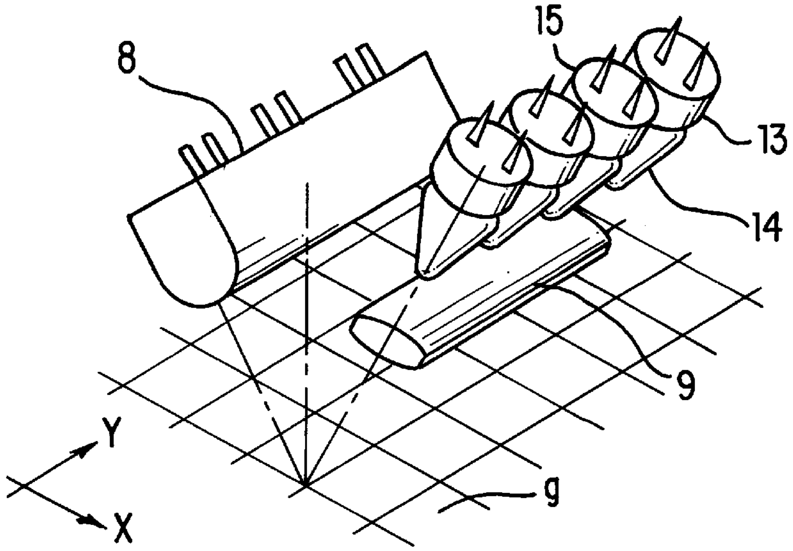
FIG. 10 is a perspective view of another example of the vertical ruled line reading sensor.

The first embodiment described above may be modified as follows:

(1) The light guide 10 and the phototransistor 11 of the vertical ruled line reading sensor 4 of FIG. 2 (or horizontal ruled line reading sensor 5) may be replaced by a photosensor array 15 comprising a plurality of light guides 14 mounted on the light receiving surfaces of a plurality of photosensors 13 as shown in FIG. 10, arranged in a row in the direction of the vertical ruled lines (or in the direction of the horizontal ruled lines). A satisfactory output level can be obtained by summation of outputs of the multiple photosensors 13.

(2) The infrared LED array 8 is used as a light source for vertical ruled line reading sensor 4 (or horizontal ruled line reading sensor 5) in the first embodiment mentioned above, but a fluorescent tube or an incandescent lamp may be used instead as the light source. In such a case, it is recommended that photosensors which can detect wavelengths of the light source with high sensitivity be used.

(3) If fluorescent materials such as zinc sulfide and cadmium sulfide are mixed used to print ink and the ruled lines of the graph paper g, then the ruled lines can be easily detected by installing a filter on the receiving surface of photosensor,on condition that the filter passes through only the wavelengths of light emitted from said fluorescent materials.

Figure 11:
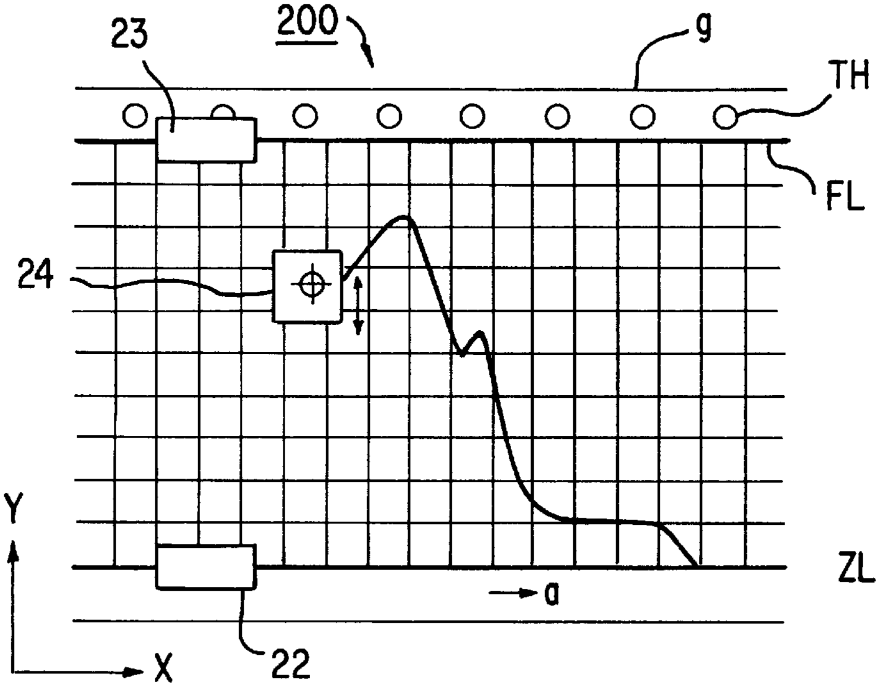
FIG. 11 is a plan view of parts of a waveform recording apparatus, which is a second embodiment of the present invention.

FIG. 11 is a plan view of parts of the waveform recording apparatus according to a second embodiment of the present invention.

The waveform recording apparatus 200 draws waveforms on the graph paper g by rotating a drum engaged with tractor holes TH of the graph paper g, while moving the graph paper g along the positive X axis direction (in the direction of the arrow a), and by moving a movable pen unit 24 along the Y axis direction according to the drawing command that has been inputted.

A zero line sensor 22 is fixed directly above the defined position at a zero line ZL of the graph paper g. A full scale line sensor 23 is fixed directly above the defined position at a full scale line FL.

Figure 12:
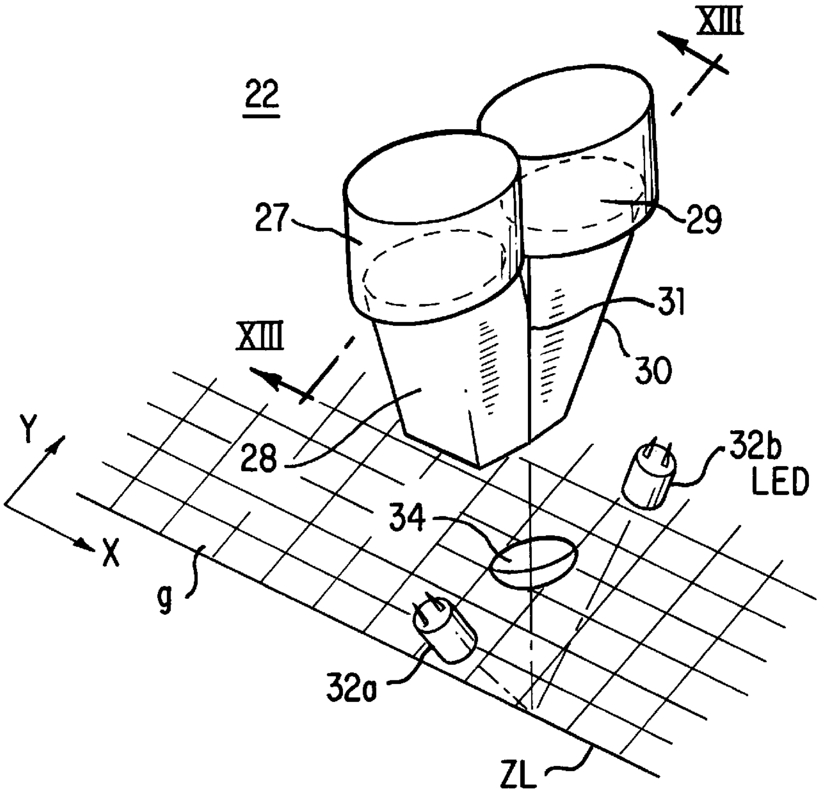
FIG. 12 is a perspective view of parts of a zero-line sensor.
Figure 13:
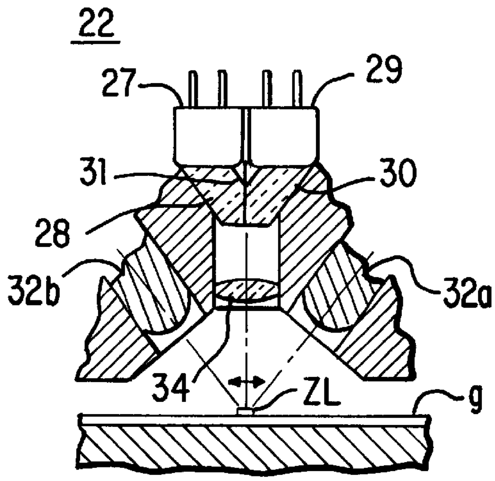
FIG. 13 is a cross section view at line XIII—XIII of FIG. 12.

FIG. 12 is a perspective view of the zero line sensor 22. FIG. 13 is a cross section view at line XIII—XIII of FIG. 12.

The zero line sensor 22 illuminates the area in the vicinity of the zero line ZL on the graph paper g by means of LED32*a* and LED32*b*. The light reflected from the paper surface (line image of zero line ZL) is picked up at the front end surfaces of light guideA 28 and light guideB 30 by a lens 34, and this light is detected by a sensorA 27 provided in the light guideA 28 and a sensorB 29 provided in the light guideB 30. A thin light shield plate 31 partitions the light guideA 28 and the light guideB 30.

The full scale line sensor 23 has a configuration similar to said zero line sensor 22.

Figure 14:
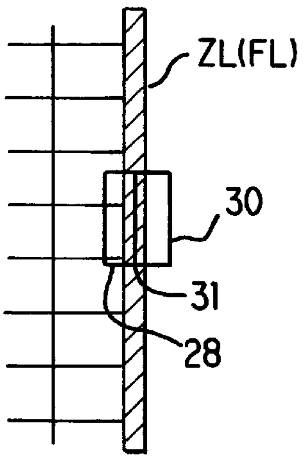
FIG. 14 is an explanatory drawing which shows a light receiving distribution of the line sensor.

As shown in FIG. 14, light rays reflected from the left half part of the zero line ZL (or full scale line FL) are received in the light guideA 28. On the other hand, light rays reflected from the right half part of the zero line ZL (or full scale line FL) are received in the light guideB 30.

Figure 15:
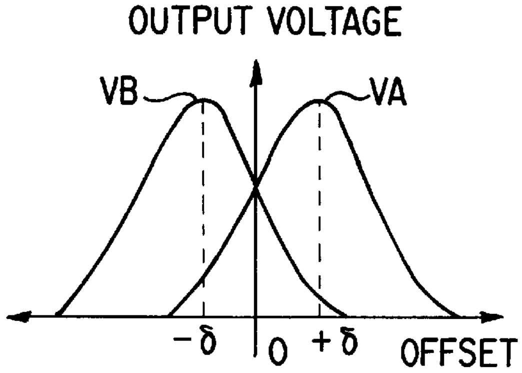
FIG. 15 is a plot of characteristics of sensor output voltage.

FIG. 15 is a plot of output characteristics of sensorA 27 and sensorB 29 corresponding to an offset of the zero line ZL (or full scale line FL) from the defined position.

When the offset is "0", the output voltages of sensorA 27 and sensorB 29 are equal, but when the offset is not "0" but is a quantity that lies in the range $\pm\delta$, either the output voltage of the sensorA 27 or output voltage of the sensorB 29 becomes greater than the other.

Figure 16:
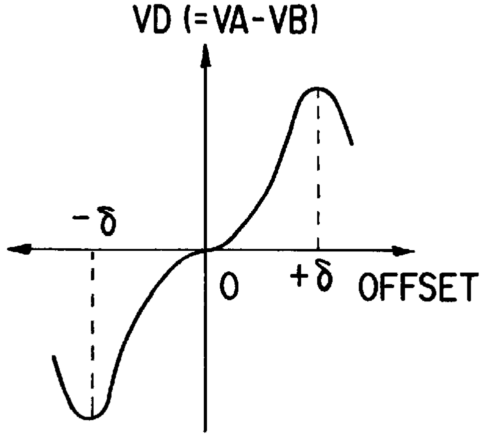
FIG. 16 is a plot of a differential sensor output voltage.

As shown in FIG. 16, from VD, a difference in voltage between the output voltage VA and the output voltage VB, (VD=VA−VB), the offset in the range $\pm\delta$ can be detected.

It is recommended that a balance adjusting circuit be provided for adjusting the balance in output voltages of the sensorA 27 and the sensorB 29, in order to eliminate the influence of ruled lines that intersect the zero line ZL or full scale line FL.

Figure 17:
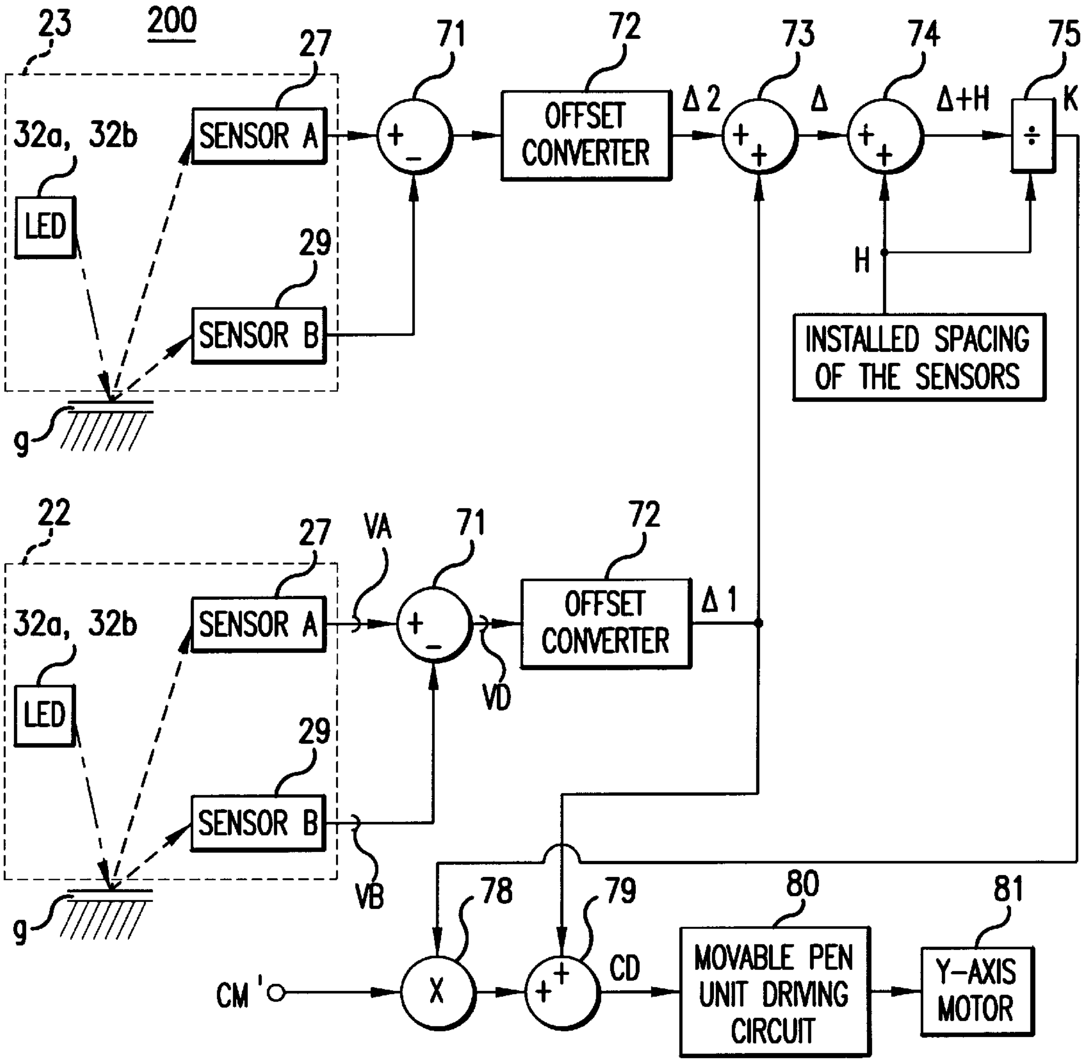
FIG. 17 is a block diagram of a signal processing system of the waveform recording apparatus of FIG. 11.

FIG. 17 is a block diagram of a signal processing system of the waveform recording apparatus 200.

In the block showing the zero line sensor 22, the graph paper g is illuminated by the sensors LED32*a* and LED32*b*, and the light rays reflected from the surface of the graph paper are detected by sensorA 27 and sensorB 29. The differential voltage VD is obtained by subtracting the output voltage VB of the sensorB 29 from the output voltage VA of the sensorA 27 using the subtractor 71. The differential voltage VD mentioned above, is converted to offset $\Delta 1$ of the zero line ZL and outputted by an offset converter 72.

Similarly, in the block showing the full scale line sensor 23, the offset $\Delta 2$ of the full scale line FL is outputted by the offset converter 72.

The offset $\Delta 1$ and the offset $\Delta 2$ are added and the total offset $\Delta$ is outputted by an adder 73.

An adder 74 adds the total offset $\Delta$ and the installed spacing H of the sensors (installed spacing of zero line sensor 22 and full scale line sensor 23), and finds the line spacing ($\Delta$+H) of the zero line ZL and the full scale line FL. This line spacing ($\Delta$+H) is equivalent to ruled line spacing Dp of the coordinate system P of the waveform recording apparatus. In contrast, an installed spacing H of sensors is equivalent to the ruled line spacing Dg of coordinate system G of the graph paper.

A divider 75 divides the line spacing ($\Delta$+H), by H, the installed spacing of sensors and calculates the conversion factor K.

An input voltage signal CM' from an external measuring device is equivalent to the drawing command. The magnitude of the input voltage signal CM' is equivalent to the coordinate Zc.

A multiplier 78 multiplies the conversion factor K with the input voltage signal CM' and outputs the converted voltage signal KCM'. This is equivalent to treating coordinate Zc in the input drawing command as coordinate Zg in the coordinate system G of the graph paper, and converting it to coordinate Zp in the coordinate system P of the waveform recording apparatus.

An adder 79 adds the offset $\Delta 1$ to the converted voltage signal KCM', to adjust the zero line and outputs the driving signal CD.

A movable pen unit driving circuit 80 controls a Y-axis motor 81 according to the driving signal CD, moves the movable pen unit 24, and draws the waveform on the traveling graph paper According to the waveform recording apparatus 200 of the second embodiment of the present invention, even if the graph paper g contracts or expands, a waveform can be drawn to match the lines ZL and FL. The result is that the ruled lines of the graph paper g can be used as a scale, and the values on the waveforms can be read with high accuracy.

Moreover, by fixing the zero line sensor 22 and the full scale line sensor 23, the movable pen unit 24 can detect the offset from the defined positions of lines ZL and FL at the upper reaches of the direction of travel of the graph paper g, therefore, eliminating the need for scanning the graph paper g and contributing to ease of use.

The second embodiment described above may be modified as below.

(1) If the width of the graph paper g is excessively large, an intermediate line sensor can be installed between the zero line sensor 22 and the full scale line sensor 23.

(2) A one-dimensional CCD sensor may be used instead of the zero line sensor 22 and the full scale line sensor 23.

(3) Explanations were given assuming analog processing, but digital processing may be used.

As explained above, according to the control method of the drawing apparatus, the drawing apparatus and the waveform recording apparatus of the present invention, figures or waveforms can be drawn to match the ruled lines of the graph paper.

Since the ruled lines are read and no special marks need to be read, ordinary graph paper can be used, thereby contributing to ease of use.

Moreover, even if a graph paper with ruled line spacing different from the ruled line spacing assumed in the drawing command is used, figures can be modified easily without the need to perform complex calculations. For instance, the command for drawing an experimental curve on section paper can be directly used without any modification for drawing the curve on a logarithmic coordinate paper.

Furthermore, a inkjet printer head or some other device instead of the pen used in the first embodiment or the second embodiment mentioned above is employable.

Figure 18:
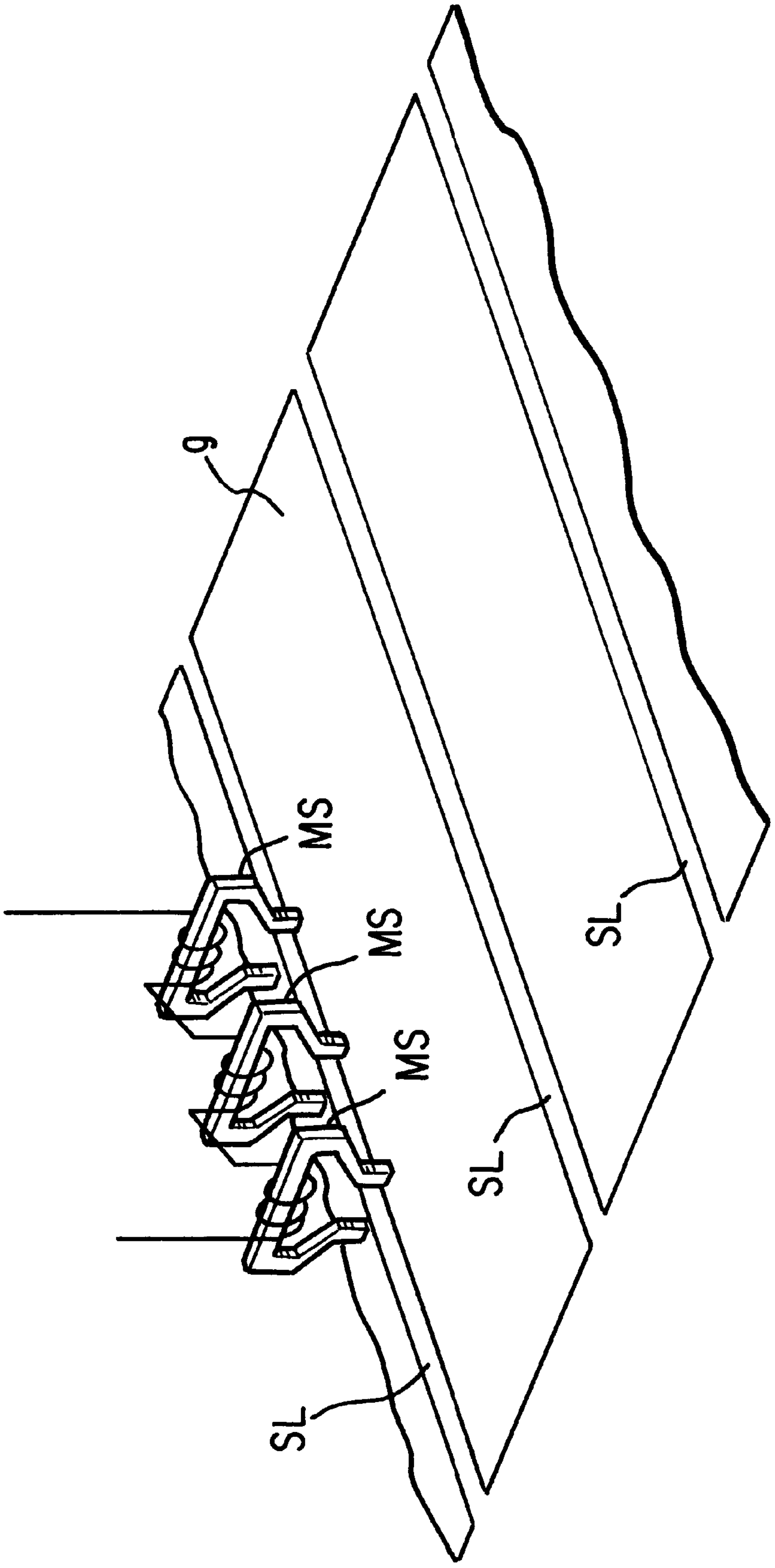
FIG. 18 is an explanatory drawing of a third embodiment of the present invention.

FIG. 18 shows a third embodiment of the present invention.

Ruled lines SL of a graph paper g are printed with magnetic-ink and are detected by magnetic sensors MS. These magnetic sensors MS are arranged in a row in the direction of the ruled line SL. A satisfactory output level can be obtained by adding outputs of these magnetic sensors MS. Magnetroresistive sensor, hole sensor or saturable reactor can be used as the magnetic sensors MS.

It is possible that each ruled line, after for example 19 lines, is printed with magnetic-ink and other ruled lines for example 18 lines between the magnetic-ink printed ruled lines, are printed with normal ink. In this case, the processing time for acquiring correspondence relationship (FIG. 5) can be shortened because the magnetic sensors ignore ruled lines printed with normal ink.

Comparing the optical sensor and magnetic sensor, the optical sensor can detect ruled lines printed with normal ink. On the other hand, the magnetic sensor does not detect stains and drawing lines as ruled lines.

What is claimed is:

1. A method for controlling a drawing apparatus for drawing figures on a graph paper having ruled lines according to an input drawing command, the method comprising the steps of:

acquiring a coordinate system G of the graph paper, units thereof and ruled line spacing Dg of the ruled lines of the graph paper in the units of the coordinate system G;

detecting the ruled lines on said graph paper and determining a ruled line spacing Dp of the ruled lines of the graph paper in terms of units of a coordinate system P of the drawing apparatus;

comparing the ruled line spacing Dg of the ruled lines in terms of the units of the coordinate system G of the graph paper with the ruled line spacing Dp in terms of said units of the coordinate system P of said drawing apparatus and determining a correspondence relationship between the coordinate system G of the graph paper and the coordinate system P of the drawing apparatus;

accepting a coordinate Zc in the input drawing command in terms of the units of the coordinate system G of the graph paper;

converting said coordinate Zc to a coordinate Zp in terms of said units of the coordinate system P of the drawing apparatus based on said correspondence relationship; and executing said drawing command using the coordinate Zp to mark the graph paper at said coordinate Zc on the graph paper.

2. A method for controlling a drawing apparatus for drawing figures on a graph paper having ruled lines according to an input drawing command, the method comprising the steps of:

acquiring a coordinate system G of the graph paper, units thereof and ruled line spacing Dg of the ruled lines of the graph paper in the units of the coordinate system G;

detecting reference correction points CP at grid points of said graph paper defined by intersections of the ruled lines of said graph paper at every n number of the ruled lines on said graph paper, wherein $n \geqq 2$, corresponding to coordinates in terms of the units of the coordinate system G of said graph paper, and determining and storing coordinates of said reference correction points CP in terms of units of a coordinate system P of said drawing apparatus in correspondence with said coordinates of said grid points in said units of said coordinate system G;

accepting said input drawing command having a coordinate Zg in terms of said units of said coordinate system G of said graph paper;

converting said coordinate Zg into coordinate Zp in terms of said units of said coordinate system P of said drawing apparatus using straight line interpolation based on said reference correction points CP in terms of said units of said coordinate system P of said drawing apparatus in stored correspondence with said coordinates of said grid points in said units of said coordinate system G; and operating said drawing apparatus in accordance with said coordinate Zp to effect execution of said input drawing command.

3. A drawing apparatus for drawing figures on a graph paper having ruled lines, comprising:

a drawing head movable over said graph paper;

means for acquiring coordinate system G of the graph paper, units thereof and ruled line spacing Dg of the ruled lines in the units of the coordinate system G;

said drawing head having a ruled line detecting means for detecting the ruled lines printed on said graph paper;

means for determining a ruled line spacing Dp of the ruled lines in terms of units of a coordinate system P of the drawing apparatus by moving said drawing head with respect to the graph paper and detecting said ruled lines and spacing therebetween prior to execution of a drawing command;

coordinate system correspondence relationship determining means for determining a correspondence relationship between the ruled line spacing Dg in terms of said units of the coordinate system G of the graph paper and the ruled line spacing Dp in terms of said units of the coordinate system P of said drawing apparatus;

coordinate conversion means for converting a coordinate Zc, provided in terms corresponding to said units of said coordinate system G of said graph paper by the input drawing command, into coordinate Zp in terms of said units of the coordinate system P of the drawing apparatus using said correspondence relationship; and coordinate replacement means for replacing said coordinate Zc with said coordinate Zp to effect execution of said drawing command.

4. The drawing apparatus of claim 3 wherein said ruled line detecting means includes light emitting means and light receiving means which have a comparatively longer sensitivity range in a direction of said ruled lines that are detected and a comparatively shorter sensitivity range perpendicular to said direction of said ruled lines.

5. A drawing apparatus for drawing on graph paper having ruled lines, comprising:

means for acquiring a graph paper coordinate system;

a detecting device for detecting line position coordinates of said ruled lines on said graph paper in terms of a drawing apparatus coordinate system;

means for storing said line position coordinates of said ruled lines in terms of said drawing apparatus coordinate system prior to a drawing operation, said line position coordinates being stored correlated to said graph paper coordinate system;

means for accepting drawing commands defining drawing position coordinates, in terms of said graph paper coordinate system, for drawing on said graph paper during said drawing operation;

a controller for converting said drawing position coordinates into converted position coordinates defined in terms of said drawing apparatus coordinate system using said line position coordinates stored correlated to said graph paper coordinate system;

a marking device for placing marks on said graph paper responsive to position instructions in terms of said drawing apparatus coordinate system; and said controller including means for executing said drawing operation using said converted position coordinates to control said marking device to mark said graph paper at positions defined by said drawing position coordinates.

6. The drawing apparatus according to claim 5 wherein:

said ruled lines on said graph paper include x-axis oriented ruled lines and y-axis oriented ruled lines orthogonal disposed relative to each other and defining grid points at intersections thereof;

said line position coordinates include grid point position coordinates of said grid points defined by said line position coordinates of said x-axis oriented ruled lines and said line position coordinates of said y-axis oriented ruled lines;

said detecting device includes an x-axis oriented line detector for detecting said line position coordinates of said x-axis oriented ruled lines and a y-axis oriented line detector for detecting said line position coordinates of said y-axis oriented ruled lines;

said line position coordinates are stored as said grid position coordinates; and said controller converts said drawing position coordinates using straight line interpolation based on ones of said grid position coordinates proximate said drawing position coordinates.

7. The drawing apparatus according to claim 6 wherein:

said x-axis oriented line detector includes an optical detection device having greater sensitivity along a direction of said x-axis ruled lines than along a direction of said y-axis ruled lines; and said y-axis oriented line detector includes an optical detection device having greater sensitivity along said direction of said y-axis ruled lines than along said direction of said x-axis ruled lines.

8. The drawing apparatus according to claim 5 wherein:

said ruled lines on said graph paper include x-axis oriented ruled lines and y-axis oriented ruled lines orthogonal disposed relative to each other; and said detecting device includes an x-axis oriented line detector for detecting said line position coordinates of said x-axis oriented ruled lines and a y-axis oriented line detector for detecting said line position coordinates of said y-axis oriented ruled lines.

9. The drawing apparatus according to claim 8 wherein:

said x-axis oriented line detector includes an optical detection device having greater sensitivity along a direction of said x-axis ruled lines than along a direction of said y-axis ruled lines; and said y-axis oriented line detector includes an optical detection device having greater sensitivity along said direction of said y-axis ruled lines than along said direction of said x-axis ruled lines.

* * * * *